United States Patent
De Graaf et al.

(10) Patent No.: US 8,881,785 B2
(45) Date of Patent: Nov. 11, 2014

(54) TYRE BUILDING DRUM WITH TURN-UP MECHANISM

(75) Inventors: Martin De Graaf, Emst (NL); Antonie Slots, Heeten (NL); Gerrit Mulder, Oene (NA); Gerrit Rodijk, Vaassen (NL); Jan Kornelis Grashuis, Apeldoorn (NL)

(73) Assignee: VMI Holland B.V., Epe (NL)

( * ) Notice: Subject to any disclaimer, the term of this patent is extended or adjusted under 35 U.S.C. 154(b) by 0 days.

(21) Appl. No.: 13/142,872

(22) PCT Filed: Nov. 26, 2010

(86) PCT No.: PCT/NL2010/050796
§ 371 (c)(1),
(2), (4) Date: Sep. 15, 2011

(87) PCT Pub. No.: WO2011/065829
PCT Pub. Date: Jun. 3, 2011

(65) Prior Publication Data
US 2011/0315322 A1    Dec. 29, 2011

Related U.S. Application Data

(60) Provisional application No. 61/283,091, filed on Nov. 27, 2009.

(30) Foreign Application Priority Data

Nov. 26, 2009  (NL) ........................... 2003874

(51) Int. Cl.
*B29D 30/32*    (2006.01)
*B29D 30/24*    (2006.01)
*B29D 30/26*    (2006.01)

(52) U.S. Cl.
CPC ........ *B29D 30/26* (2013.01); *B29D 2030/3264* (2013.01); *B29D 30/244* (2013.01)
USPC ............ 156/400; 156/378; 156/402; 156/414

(58) Field of Classification Search
USPC ......... 156/132, 402, 414, 416, 417, 418, 419, 156/420, 400, 378; 73/37, 37.5
See application file for complete search history.

(56) References Cited

U.S. PATENT DOCUMENTS 3,709,027 A    1/1973  Beeken
3,888,720 A *  6/1975  Habert ......................... 156/414

(Continued)

FOREIGN PATENT DOCUMENTS

CN    1418149 A    5/2003
CN    1681642 A    10/2005

(Continued)

OTHER PUBLICATIONS

Machine-generated English language translation of JP 2008-296407 (original document dated Dec. 2008).*

(Continued)

*Primary Examiner* — Martin Rogers
(74) *Attorney, Agent, or Firm* — Ladas & Parry LLP

(57) ABSTRACT

Tire building drum having a turn-up mechanism for use in building an unvulcanized tire using rubber tire components, having two sets of turn-up arms (14), wherein each set of arms is connected to an axially shiftable arm support (17). The tire building drum is provided with means on the one hand for shifting the arm supports in a first direction to move the sets of turn-up arms axially towards each other, wherein the arras are tiltable in radial planes from a starting position to a tilting position, and on the other hand for in a second direction, opposite the first direction, shifting the arm supports to move the arms axially apart from the tilting position into the starting position. The tire building drum is provided with a pneumatic detection device (20) (23) for detecting whether at least one of the moving parts, such as the arms or the clamping device, are in the starting position, and for giving a detection signal indicating whether or not the arms are in the starting position.

14 Claims, 11 Drawing Sheets

(56) References Cited

U.S. PATENT DOCUMENTS

Figure 1A:
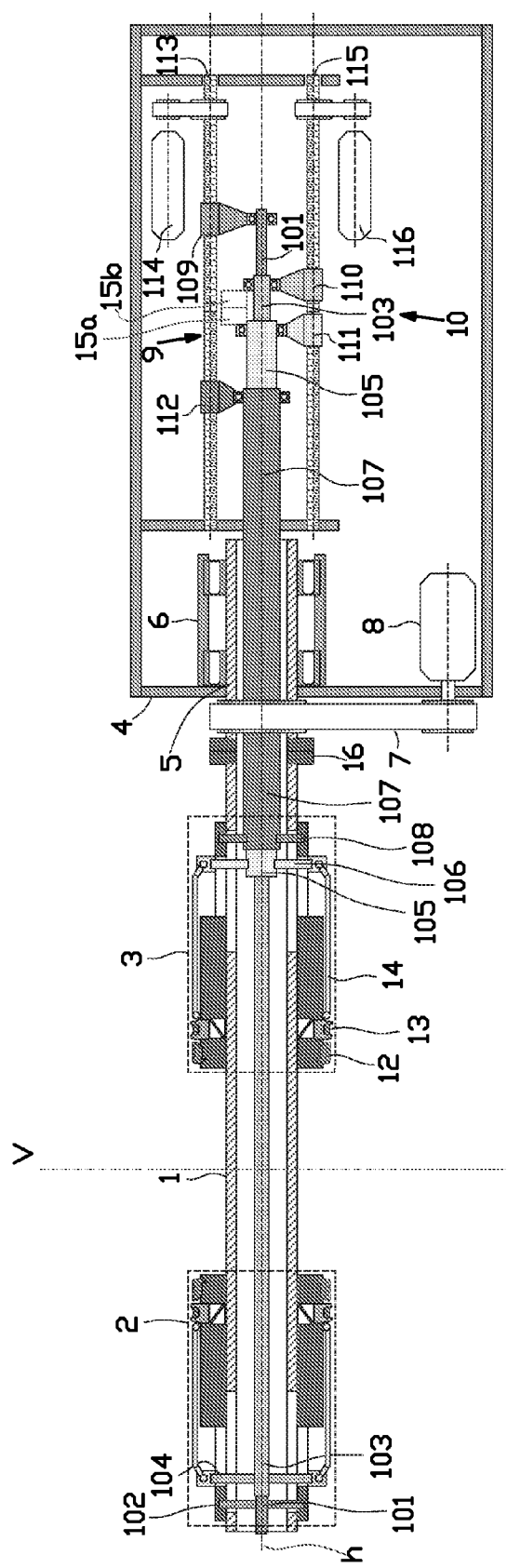

| | | | |
|---|---|---|---|
| 3,894,423 A * | 7/1975 | Messmer | 73/37.5 |
| 4,015,494 A * | 4/1977 | Spooner et al. | 83/76 |
| 4,229,629 A | 10/1980 | Pawlowski | |
| 4,477,215 A * | 10/1984 | Gabriele | 409/245 |
| 4,850,221 A * | 7/1989 | Zielke | 73/37.5 |
| 5,224,374 A * | 7/1993 | Ayers | 73/37.5 |
| 6,248,975 B1 * | 6/2001 | Lanouette et al. | 219/130.21 |
| 6,318,434 B1 | 11/2001 | Gutknecht et al. | |
| 6,469,265 B1 * | 10/2002 | Penix et al. | 200/50.32 |
| 7,325,445 B1 * | 2/2008 | Bowman | 73/104 |
| 2005/0231318 A1 * | 10/2005 | Bullington | 337/36 |

FOREIGN PATENT DOCUMENTS

| | | | | |
|---|---|---|---|---|
| CN | 1705555 A | | 12/2005 | |
| DE | 2411014 | * | 9/1975 | B29H 17/12 |
| DE | 2445471 | * | 4/1976 | F15B 13/01 |
| EP | 1 547 757 A1 | | 6/2005 | |
| EP | 1 562 738 A2 | | 8/2005 | |
| GB | 1 110 237 A | | 4/1968 | |
| JP | 59-52707 A1 | | 3/1984 | |
| JP | 2008 296407 A | | 12/2008 | |
| JP | 2009 034856 A | | 2/2009 | |
| SU | 1763236 | * | 9/1992 | B29D 30/18 |
| SU | 1452023 | * | 10/1994 | B29D 30/18 |
| WO | 01/68356 A1 | | 9/2001 | |
| WO | 2004/035301 A2 | | 4/2004 | |

OTHER PUBLICATIONS

Machine-generated English language translation of DE 2445471 (original document dated Apr. 1976).*

English language Abstract for SU 1763236 (original document dated Sep. 1992).*

English language Abstract for SU 1452023 (original document dated Oct. 1994).*

Pneumatic Logic & Controls Parker Hannifin Corporation. Pneumatic Dicision Catalog PCC-4/USA; Jan. 2007.*

Machine generated English language translation of DE 2411014 (original docuemtn dated Sep. 1975).*

Search Report dated Apr. 18, 2014 in connection with co-pending Chinese Application No. 201080005744.2 (Publ. No. CN 1022300701A).

Patent Abstracts of Japan English abstract of JP 59-52707 A1.

\* cited by examiner

TYRE BUILDING DRUM WITH TURN-UP MECHANISM

This application is a 371 of PCT/NL2010/050796 filed Nov. 26, 2010 which claims benefit of U.S. Application 61/283,091 filed Nov. 27, 2009 and Netherlands Application 2003874 filed Nov. 26, 2009.

BACKGROUND OF THE INVENTION

The invention relates to a tyre building drum having a turn-up mechanism for use in building an unvulcanised tyre using rubber tyre components that may or may not have been provided with reinforcement cords and two bead cores that may or may not have been provided with an apex.

A known tyre building drum is provided with a basic part having a central shaft, two ring segments (also called clamping mechanisms) placed around the shaft and spaced apart from each other, for supporting the bead cores and means for radially expanding the part of the tyre components that is situated within the ring segments. On either side outside of the ring segments, the tyre building drum is provided with a set of axially extending arms (also called turn-up or folding arms), wherein at a first free outer end oriented towards the ring segment each arm is provided with a first turn-up member, generally a turn-up roller, and at an opposite second outer end they are hinged to an axially shiftable arm support. Near the first outer end at least a part of each arm may be provided with means for supporting the tyre component, alternatively the tyre building drum may comprise individual support means, that are not connected to the arms.

In a so-called starting position the support means form a circumferential support surface for the tyre components. For the turn-up process use is made of means for shifting the arm supports. On the one hand said means are able to move the second outer ends of both sets of arms axially towards each other in a first direction. Because simultaneously the part of the tyre components that is situated within the ring segments is expanded, the arms will be subjected to a tilting in radial planes towards a tilting position, as a result of which the first outer ends move axially and radially while pressing the part of the tyre components that was originally outside of the ring segments against the expanded part of the tyre components that is situated within the ring segments. On the other hand said means ensure that the arms can be moved back from the tilting position to the starting position, because the means axially move the arm supports apart in a second direction, opposite the first direction.

Such tyre building drums provided with a turn-up mechanism, are generally known. They may be designed as tyre building drum on which the tyre components, in particular liner and carcass layers and sides are supplied and of which a cylindrical casing is being made, and also bead cores are supplied, after which the cylindrical casing on the tyre building drum is expanded into a shaped torus shape, in which the sides of the casing are turned up about the bead cores by means of the turn-up mechanism. They may also be designed as a shaping drum, to which an already formed cylindrical carcass casing has been supplied.

Such a tyre building drum with turn-up mechanism is among others known from EP-A-1.562.738. During the turn-up process, in which the, arms tilt, the parts of the tyre components situated on the support means shift over the support means towards the turn-up member (turn-up roller) to be discharged from there. Due to a mechanic coupling the sets of hinging arms on either side can be moved synchronously from the starting position to the tilting position outside of the ring segments. Although the known tyre building drum usually functions satisfactorily and produces accurate tyres within the set tolerances, it has turned out that in practice a number of produced tyres were of inferior quality.

SUMMARY OF THE INVENTION

It is an object of the present invention to provide a tyre building drum with a simple turn-up mechanism having arms with which tyres can be manufactured accurately.

According to a first aspect the invention provides a tyre building drum with turn-up mechanism for use in building an unvulcanised tyre using rubber tyre components, with two bead cores, wherein the tyre building drum is provided with:

a basic part having a central drum shaft;

two ring segments placed around the shaft and spaced apart from each other, for supporting the bead cores;

an expansion device for radially expanding the part of the tyre components situated within the ring segments;

two sets of, in a starting position, axially extending arms that are placed on either side outside of the ring segments, wherein at a first free outer end oriented towards the ring segments the arms are provided with a first turn-up member, and at an opposing second outer end they are hinged to an axially shiftable arm support, a shifting device on the one hand for in a first direction shifting the arm supports to move the second outer ends of both sets of arms axially towards each other, wherein the arms are tiltable in radial planes from the starting position to a tilting position for as a result axially and radially moving the first outer ends while pressing the part of the tyre components situated outside of the ring segments against the expanded part of the tyre components situated within the ring segments, and on the other hand for in a second direction, opposite the first direction, shifting the arm supports to move the arms axially apart from the tilting position to the starting position, a detection device for detecting whether at least one movable part of the tyre building drum is in a wanted position, characterised in that the detection device comprises a compressed air source and an air channel connected or connectable with the compressed air source, wherein the air channel comprises an opening, and wherein the movable part, at least in or near the wanted position, is coupled to the opening for adjusting or changing a flow and/or a pressure in the air channel, wherein the detection device furthermore comprises a flow and/or pressure meter for measuring the flow or the pressure, respectively, in the air channel.

The tyre building drum according to the invention is provided with a detection device for detecting whether at least one of the movable parts, such as the arms or the clamping mechanism and the like, are in the wanted position, for instance the starting position. By making use of measuring a flow or pressure in an air channel the detection can take place remote from the opening and it is not necessary to place a flow and/or pressure meter near the moving part.

The detection device can now give a detection signal indicating whether or not the movable part is in the wanted position, and in particular it can be verified whether the moving part is in wanted position correctly. If this is not the case a signal given can automatically prevent a next process step from being carried out. Additionally or alternatively a signal given can for instance activate an alarm device for giving an alarm or the detection signal may automatically stop the operation of the tyre building drum. In that way it is possible to bring the moving part in the correct position before a next process step has to be carried out, so that tyres can be manufactured safely and accurately.

In one embodiment the movable part, at least in or near the wanted position, abuts a contact surface of a stop part in a substantially sealing manner, wherein the air channel debouches on or in the contact surface of the stop part.

In one embodiment the air channel at least partially runs through the stop part (22).

In one embodiment the detection device furthermore comprises a safety bush with a prestressing spring, wherein the safety bush is pressed against the contact surface in a substantially sealing manner by means of the prestressing spring, and wherein the movable part, at least in or near the wanted position, is coupled to the safety bush.

In one embodiment the movable part, at least in or near the wanted position, abuts the safety bush.

In one embodiment the movable part, at least in the wanted position, abuts the safety bush in a forceless manner.

In one embodiment the air channel runs through a part of the safety bush.

In one embodiment the flow and/or pressure meter is placed in a main housing of the tyre building drum and/or spaced apart from the central drum shaft.

In one embodiment the movable part comprises at least one of the ring segments.

In one embodiment the movable part comprises at least one of the arms, an arm support or the shifting device.

In one embodiment the detection device is adapted for detecting whether the arms are in the starting position, and for giving a detection signal indicating whether or not the arms are in the starting position.

In one embodiment the shifting device comprises pull/push rods that extend substantially parallel to a centre line of the drum shaft to within a main housing of the tyre building drum, in which main housing a drive mechanism is placed with which the pull/push rods are operationally coupled, and wherein in the main housing a detection device is placed for detecting whether at least one of the pull/push rods of the tyre building drum is in the wanted position.

In one embodiment the detection device comprises an electric contact arranged in the main housing.

In one embodiment the detection device further comprises an electric contact arranged in the tyre building drum.

In one embodiment the detection device is adapted for giving a detection signal when the moving part is not correctly placed at the wanted position.

According to a second aspect the invention provides a tyre building drum with turn-up mechanism for use in building an unvulcanised tyre using rubber tyre components, with two bead cores, wherein the tyre building drum is provided with:

a basic part having a central drum shaft;

two ring segments placed around the shaft and spaced apart from each other, for supporting the bead cores;

an expansion device for radially expanding the part of the tyre components situated within the ring segments;

two sets of, in a starting position, axially extending arms that are placed on either side outside of the ring segments, wherein at a first free outer end oriented towards the ring segments the arms are provided with a first turn-up member, and at an opposing second outer end they are hinged to an axially shiftable arm support, a shifting device on the one hand for in a first direction shifting the arm supports to move the second outer ends of both sets of arms axially towards each other, wherein the arms are tiltable in radial planes from the starting position to a tilting position for as a result axially and radially moving the first outer ends while pressing the part of the tyre components situated outside of the ring segments against the expanded part of the tyre components situated within the ring segments, and on the other hand for in a second direction, opposite the first direction, shifting the arm supports to move the arms axially apart from the tilting position to the starting position, wherein the shifting device comprises pull/push rods that extend substantially parallel to a centre line of the drum shaft to within a main housing of the tyre building drum, in which main housing a drive mechanism is placed with which the pull/push rods are operationally coupled, and a detection device for detecting whether at least one movable part of the tyre building drum is in a wanted position, wherein the detection device is placed in the main housing for detecting whether at least one of the pull/push rods of the tyre building drum is in the wanted position.

In one embodiment the detection device comprises an electric contact arranged in the main housing.

According to a further aspect the invention provides a tyre building drum with turn-up mechanism for use in building an unvulcanised tyre using rubber tyre components, with two bead cores, wherein the tyre building drum is provided with a basic part having a central drum shaft, two ring segments placed around the shaft and spaced apart from each other, for supporting the bead cores and expansion device for radially expanding the part of the tyre components situated within the ring segments and wherein on either side outside of the ring segments the tyre building drum is provided with a set of axially extending arms, wherein at a first free outer end oriented towards the ring segment the arms are provided with a first turn-up member, and at an opposing second outer end it is hinged to an axially shiftable arm support, wherein the tyre building drum is furthermore provided with a shifting device on the one hand for in a first direction shifting the arm supports to move the second outer ends of both sets of arms axially towards each other, wherein the arms are tiltable in radial planes from the starting position to a tilting position for as a result axially and radially moving the first outer ends while pressing the part of the tyre components situated outside of the ring segments against the expanded part of the tyre components situated within the ring segments, and on the other hand for in a second direction, opposite the first direction, shifting the arm supports to move the arms axially apart from the tilting position to the starting position, characterised in that the tyre building drum is provided with a detection device for detecting whether the arms are in the starting position, and for giving a detection signal indicating whether or not the arms are in the starting position.

A long survey proved that at least a part of the problems in the known tyre building drum is caused because in some cases at least one of the arms, after having been brought into the tilting position, subsequently is not fully moved into the starting position. As a result the first outer end of the arm still projects slightly radially, as a result of which not only tyre components that are arranged on the arm are not correctly positioned, the process steps after bringing the arm incorrectly in the starting position are not carried out correctly either and in some cases are carried out unsafely. By according to the invention providing the tyre building drum with a detection device for detecting whether the arms are in the starting position, and for giving a detection signal indicating whether or not the arms are in the starting position, it can be verified whether the arms are correctly in the starting position. When this is not the case the signal given can automatically prevent a next process step from being carried out. Additionally or alternatively the signal given can for instance activate an alarm device for giving an alarm or the detection signal can automatically stop the operation of the tyre building drum. In that way it will be possible to bring the arms into the correct position before a next process step has to be carried out, so that tyres can be manufactured safely and accurately.

In an advantageous embodiment of a tyre building drum according to the invention the detection device comprises an electric contact arranged in the tyre building drum. Additionally or alternatively the detection device may comprise an external sensor. Such a sensor may for instance be a light sensor, a magnet sensor or a camera system.

In a highly compact embodiment of a tyre building drum according to the invention the detection device comprises a compressed air source and an air channel connected or connectable to a compressed air source, wherein in the starting position an arm support abuts a contact surface of a stop part of the basic part in a sealing manner, wherein the air channel runs through the stop part, wherein the air channel debouches on the contact surface of the stop part, wherein the detection device preferably also contains a flow and/or pressure meter for measuring the flow or the pressure, respectively, in the air channel. In one embodiment of a tyre building drum according to the invention an even more accurate detection of the position of the arms and an even safer operation of the tyre building drum is achieved because the second outer end of each arm is provided with an abutting end, in which each stop part at its outer circumference is provided with a recess, wherein in the recess a safety bush is accommodated, which safety bush has a contact wall which by means of a prestressing spring is sealingly pressed against a wall of the recess, wherein the safety bush is provided with a free outer end which in the starting position abuts the abutting end of the arms in a forceless manner, and wherein the air channel runs through a part of the safety bush. Because use is made of an air channel a compact tyre building drum can be achieved.

SHORT DESCRIPTION OF THE DRAWINGS

Figure 2:
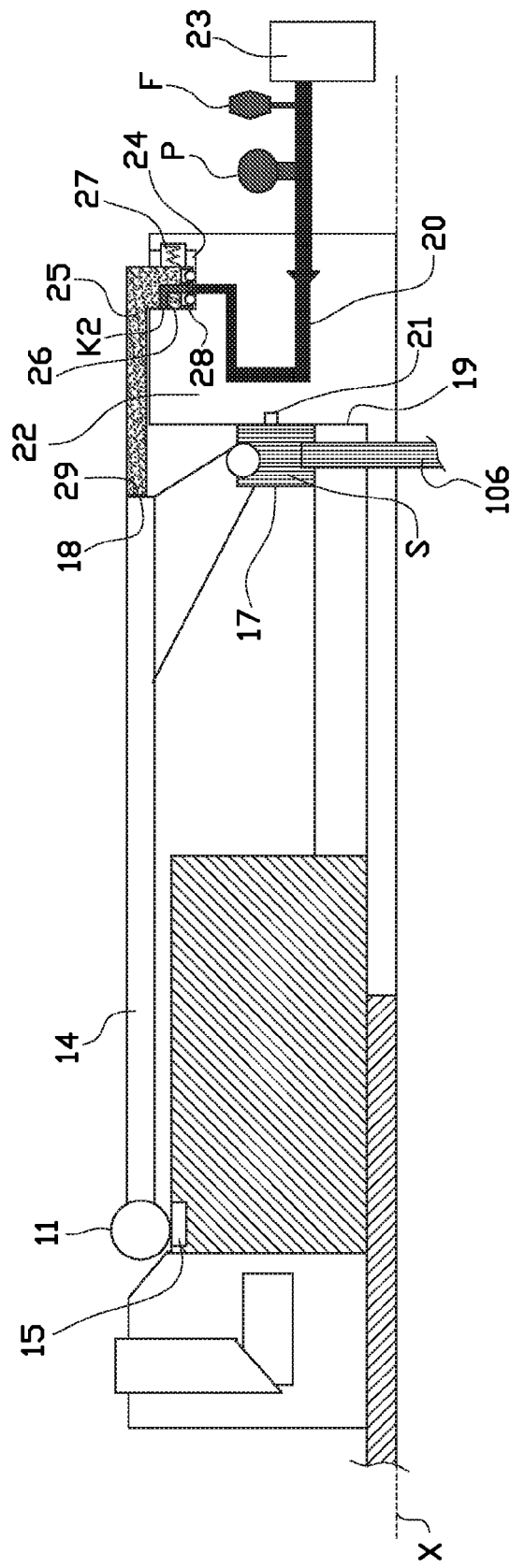
Figure 3:
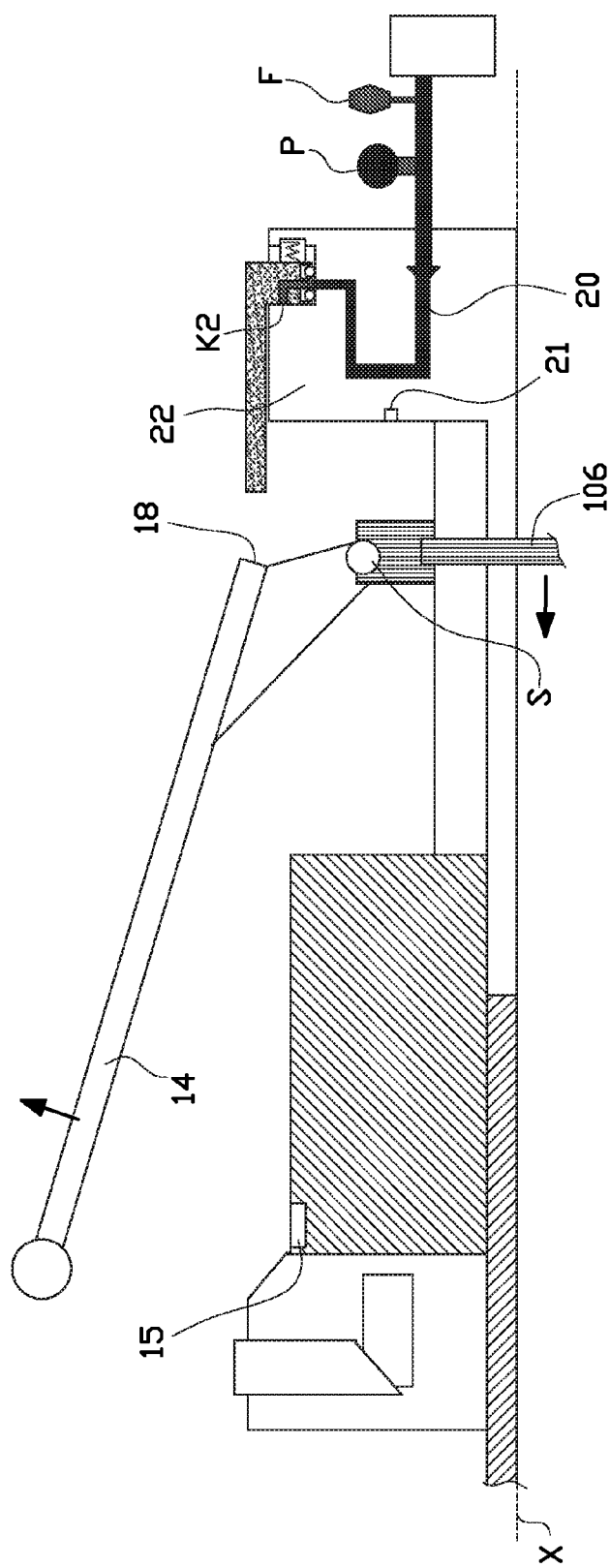
Figure 4:
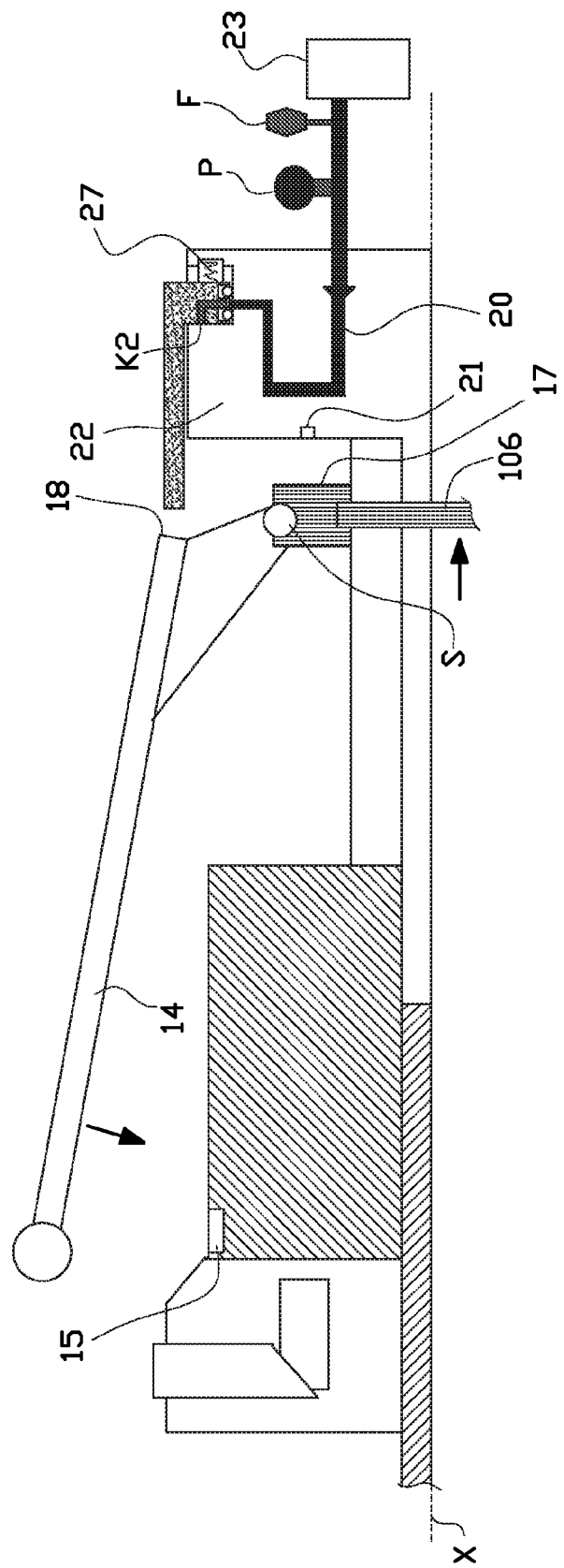
Figure 5:
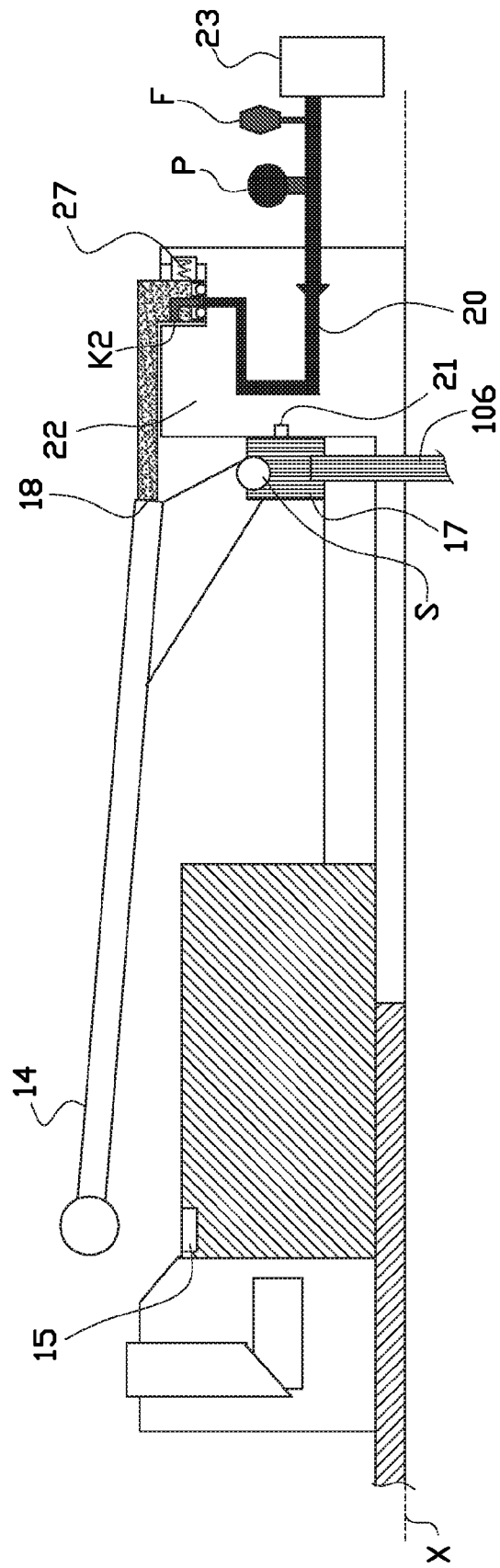
Figure 6:
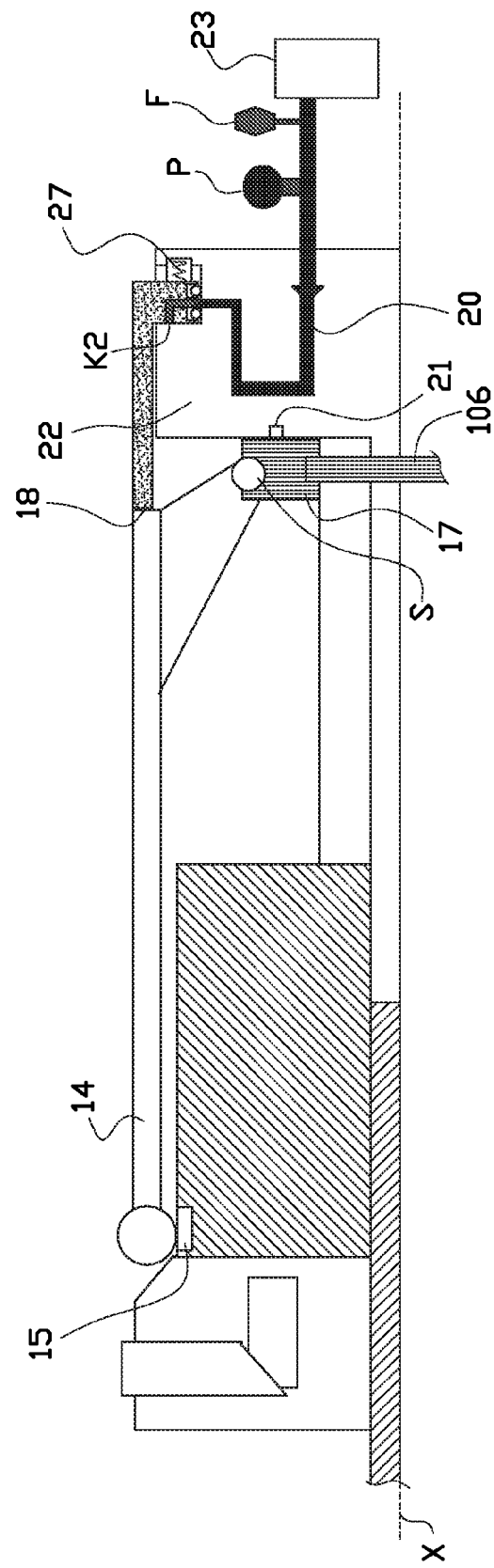
Figure 7:
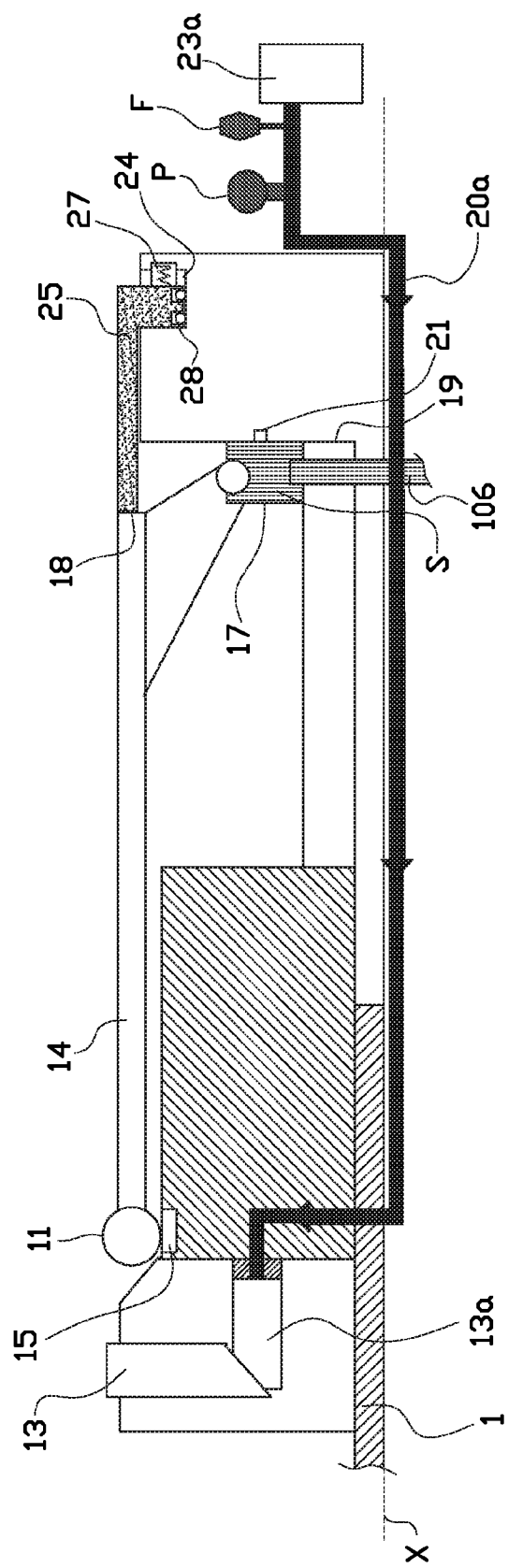
Figure 8:
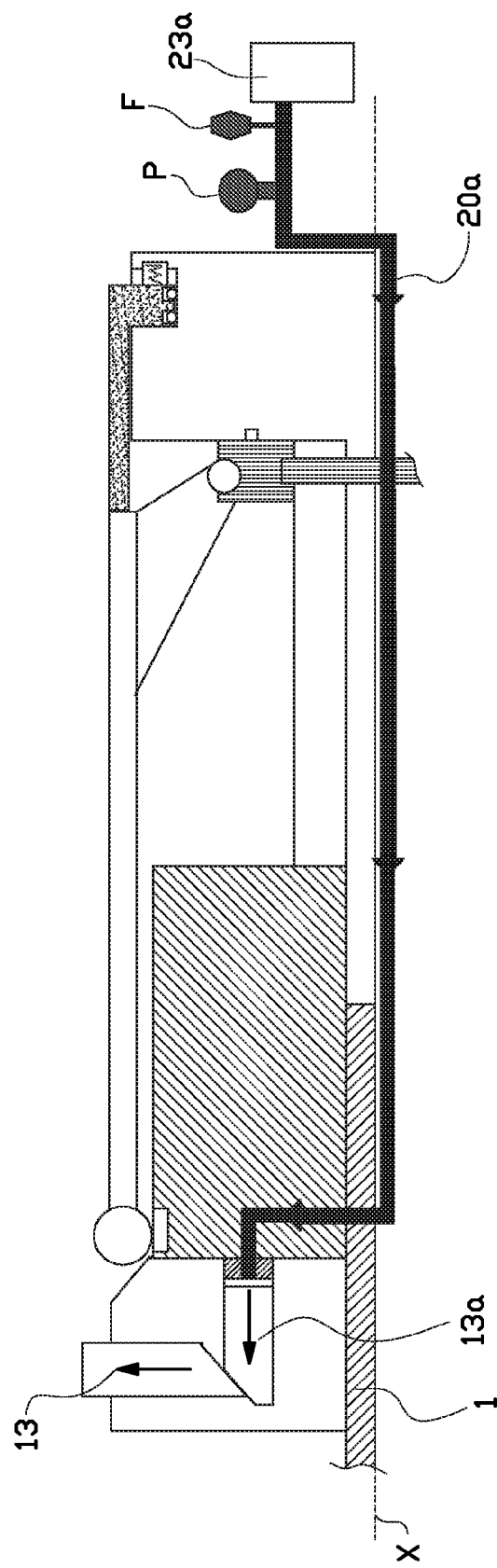

The invention will be elucidated on the basis of a number of exemplary embodiments shown in the attached drawings, in which:

FIGS. 1A-1D schematically show a longitudinal section of a tyre building drum having a turn-up mechanism for building an unvulcanised tyre, in several treatment steps;

FIG. 2 schematically shows a longitudinal section of a part of a tyre building drum according to the invention, wherein the arms are in the starting position;

FIG. 3 schematically shows a longitudinal section of a part of a tyre building drum according to the invention, wherein the arms are in the tilting position;

FIG. 4 schematically shows a longitudinal section of a part of a tyre building drum according to the invention, wherein the arms are in a position between the tilting position and the starting position;

FIG. 5 schematically shows a longitudinal section of a part of a tyre building drum according to the invention, wherein the arms are incorrectly in the starting position;

FIG. 6 schematically shows a longitudinal section of a part of a tyre building drum according to the invention, wherein the arms are in the starting position again;

FIG. 7 schematically shows a longitudinal section of a part of a second exemplary embodiment of a tyre building drum according to the invention, wherein the clamping mechanism is in the starting position; and FIG. 8 schematically shows a longitudinal section of a part of a second exemplary embodiment of a tyre building drum according to the invention, wherein the clamping mechanism is in a radially extended position.

DETAILED DESCRIPTION OF THE DRAWINGS

FIG. 1A shows a side view in cross-section of an exemplary embodiment of a tyre building drum to which the invention can be applied. Building an unvulcanised tyre using rubber tyre components takes place on a first drum half 2 and a second drum half 3, that are arranged at least almost substantially symmetrical with respect to the centre of the tyre building drum and around the drum shaft 1. The first and second drum halves 2, 3 can be moved in axial direction along the drum shaft 1. Each drum half 2, 3 comprises a folding arm unit, also called turn-up mechanism, having folding arms 14, that are connected to the drum half 2, 3 in question in a swivelling manner. Furthermore the drum halves 2, 3 are provided with a shoulder support 12 and a ring segment 13 for supporting the bead cores b, also called clamping mechanism.

The tyre building drum comprises a hollow drum shaft 1 in which a transmission for the drive of the drum halves 2, 3 and of the folding arm units is housed. Said transmission comprises four pull/push rods 101, 103, 105, 107, that are concentrically placed in the drum shaft 1.

The most central pull/push rod is the first pull/push rod 101, which near its outer end situated within the drum shaft 1, via a first connecting part or flight pin 102 is coupled to the first drum half 2 (not shown in detail). Around at least a portion of the central first pull/push rod 101 the tubular third pull/push rod 103 is placed, which near its outer end situated within the drum shaft 1 via a third connecting part or flight pin 104 is coupled to the folding arm unit of the first drum half 2. Around at least a portion of third pull/push rod 103 the tubular fourth pull/push rod 105 is placed, which near its outer end situated within the drum shaft 1 via a fourth connecting part or flight pin 106 is coupled to the folding arm unit of the second drum half 3. Around at least a portion of the fourth pull/push rod 105 the tubular second pull/push rod 107 is placed, which near its outer end situated within the drum shaft 1 via a second connecting part or flight pin 108 is coupled to the second drum half 3.

The four pull/push rods 101, 103, 105, 107 extend substantially parallel to the centre line h of the drum shaft 1 to within the main housing 4 of the tyre building drum. In the main housing 4 a drive mechanism 9, 10 is placed with which the pull/push rods 101, 103, 105, 107 are coupled as described below in more detail.

The drum shaft 1 comprises a first and a second drum shaft portion, wherein the first drum shaft portion also called driving shaft 5, is rotatable in a bearing device 6 placed in the main housing 4. The second drum shaft portion is connected to the first drum shaft portion via a coupling member that is adapted for substantially axially and detachably coupling the first drum shaft portion to the second drum shaft portion, via a flange coupling 15.

The second drum shaft portion is provided with a first drum shaft slot for accommodating a first connecting part 102 for connecting the first pull/push rod 101 to the first drum half 2. The first drum shaft slot may further be adapted for accommodating a second connecting part 104 for connecting the third pull/push rod 103 to the folding arm unit of the first drum half 2. However in an alternative embodiment a separate drum shaft slot may have been provided for the second connecting part. The second drum shaft portion furthermore also comprises a second drum shaft slot for accommodating a third connecting part 108 for connecting the second pull/push rod 107 to the second drum half 3. The second drum shaft slot may furthermore be adapted for accommodating the fourth connecting part 106 for connecting the fourth pull/push rod 105 to the folding arm unit of the second drum half 3. However in an alternative embodiment a separate drum shaft slot may have been provided for the fourth connecting part.

The driving shaft 5 is coupled to a drum shaft driving motor 8 by means of a belt transmission 7, wherein the belt transmission 7 is placed at a side of the bearing device 6 extending away from the drive mechanism 9, 10. As shown in FIG. 1A, the belt transmission 7 is placed outside of the main housing 4.

Furthermore within the main housing 4, the drive mechanism 9, 10 is placed substantially in the extension of the drum shaft 1, behind the bearing device 6. The four pull/push rods 101, 103, 105, 107 extend beyond the bearing device 6 up into the drive mechanism 9, 10.

The drive mechanism 9, 10 comprises a first spindle 113 and a second spindle 115, which are placed substantially on either side of a centre line h of the drum shaft 1. The first spindle 113 is provided with a thread which on either side of the middle of the drive mechanism has an equally large pitch but of an opposite direction. On the first spindle 113 on either side of the middle of the drive mechanism 9 a first flight nut 109 and a second flight nut 112 are arranged, wherein the first and second flight nut 109, 112 are connected to the first pull/push rod 101 and the second pull/push rod 107, respectively. The second spindle 115 is provided with thread which on either side of the middle of the drive mechanism has an equally large pitch but of an opposite direction. On the second spindle 115 on either side of the middle of the drive mechanism 10 a third flight nut 110 and a fourth flight nut 111 are arranged, wherein the third and fourth flight nut 110, 111 are connected to the third pull/push rod 103 and the fourth pull/push rod 105, respectively. When driving the first 113 and second 115 spindle, respectively, the first and second flight nut 109, 112 and third and fourth flight nut 110, 111, respectively, will be driven at substantially the same speed but in opposite direction. As the pull/push rods 101, 103, 105, 107 move along with the drum shaft 1 and the drive mechanism 9, 10 is substantially fixated in the main housing 4, the pull/push rods 101, 103, 105, 107 are connected to the respective flight nuts 109, 112, 110, 111 via a bearing.

Optionally the flight nuts 109, 110, 111 and 112 can be supported by linear guides.

Figure 1B:
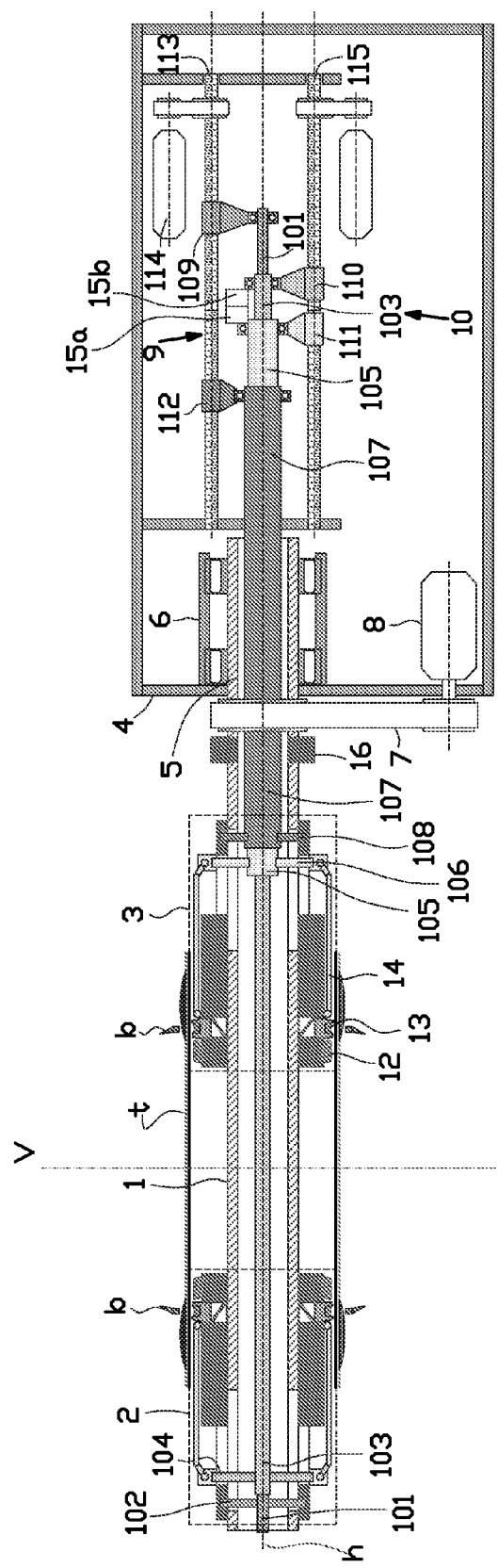

For determining the position of for instance the flight nuts 110, 111 of the pull/push rods 103, 105 of the turn-up or folding arms 14, two sensors 15a, 15b are placed in the main housing 4, which sensors are activated by the flight nuts when the turn-up or folding arms 14 are in the starting position, as shown in FIGS. 1A and 1B.

The first spindle 113 and the second spindle 115 are each coupled to their own servomotor 114, 116 via a belt transmission.

The drive mechanism 9, 10 as discussed in detail above, provides a considerable improvement in the synchronous movement of the drum halves 2, 3, and of the folding arms 14 of the drum halves 2, 3. For adjusting the position of the first drum half 2 and its folding arms mirror-symmetrically with respect to the position of the second drum half 3 and its folding arms, particularly mirror-symmetrically in perpendicular bisector plane v through the middle of the tyre building drum, the first pull/push rod 101 is substantially axially adjustably coupled to the first flight nut 109, and the third pull/push rod 103 is substantially axially adjustably coupled to the third flight nut 110. Optionally the second and/or fourth flight nut can also be substantially axially adjustably coupled to the pull/push rod in question.

In the embodiment as shown in FIG. 1A, the drive mechanisms 9, 10 are placed on either side above and below the centre line h of the drum shaft 1. In this embodiment the spindles 113, 115 are placed parallel to the pull/push rods 101, 103, 105, 107 on a so-called 12 o'clock-6 o'clock position. In an alternative embodiment the drive mechanisms can also be placed on other positions around the centre line h. For instance the drive mechanisms 9, 10 can be placed on either side of the centre line h in a substantially horizontal plane on a so-called 9 o'clock-3 o'clock position, or the drive mechanisms 9, 10 can be placed at an angle wherein the intersection of the centre line h and the first 113 and second 115 spindle with a plane perpendicular form the vertices of a triangle, for instance on a so-called 8 o'clock-4 o'clock position.

In an alternative embodiment the drive mechanism 9, 10 can be also be designed double. In that case each pull/push rod has its own spindle. Said four spindles can then be placed around the centre line h of the drum shaft 1, for instance on a so-called 12 o'clock-3 o'clock-6 o'clock-9 o'clock position.

In use the tyre components t of rubber with the beads b on the drum halves 2, 3 that are placed in a defined starting position, as shown in FIG. 1B.

Figure 1C:
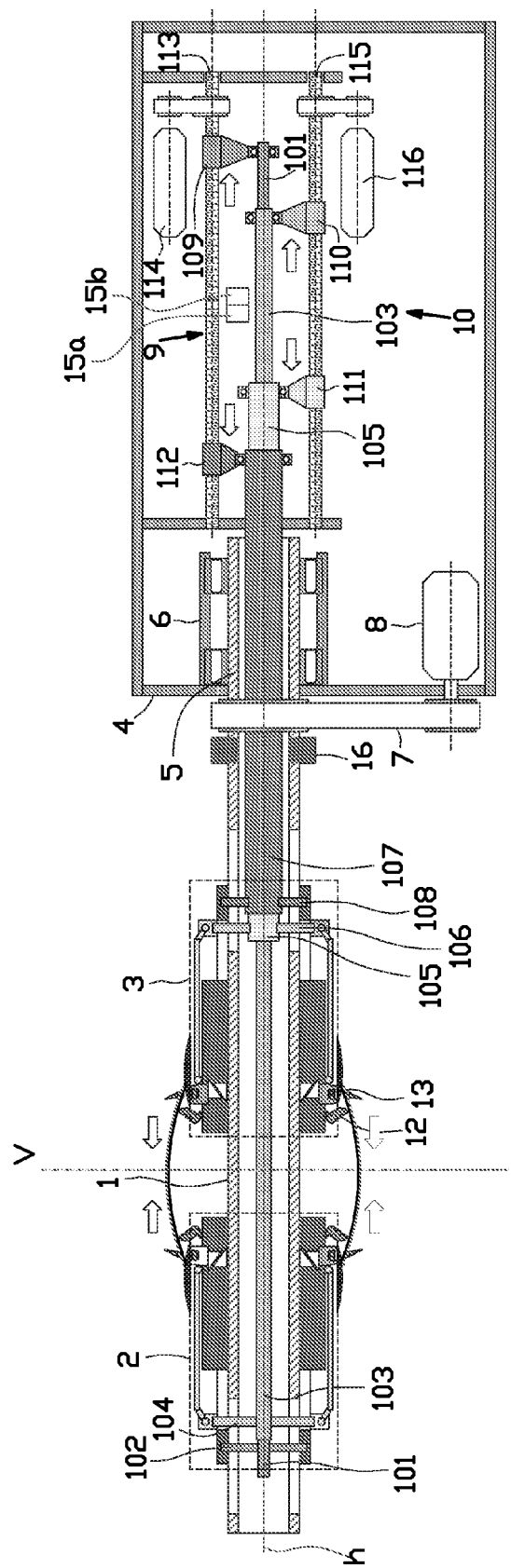

Subsequently the drum halves 2, 3 are shifted to the centre of the tyre building drum by shifting at least the first 101 and the second 107 pull/push rod, as shown in FIG. 1C. For shifting the drum halves 2, 3 without turning up the folding arms 14, on the one hand the first 101 and third 103 pull/push rod are substantially jointly driven and simultaneously the second 107 and fourth 105 pull/push rod are substantially jointly driven. This can be achieved by driving the first and second spindle 113, 115 at the same speed and in the same direction by means of the first and second servomotor 114, 116.

Figure 1D:
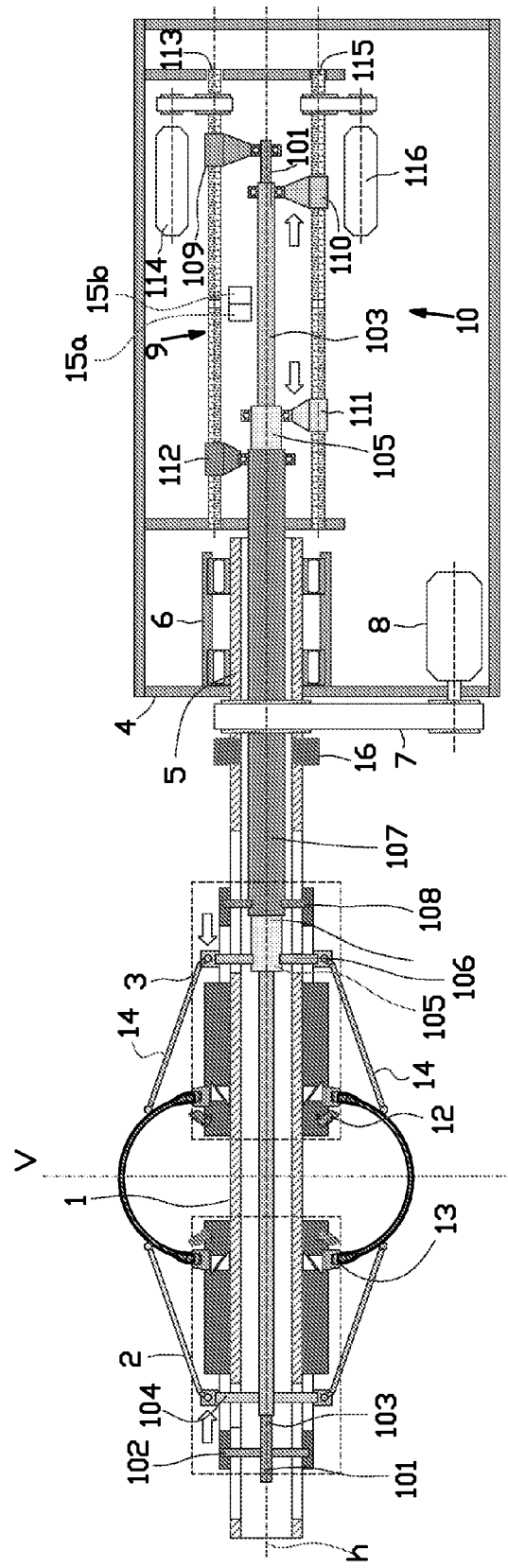

Subsequently the folding arms 14 are activated to stitch the rubber components. For swivelling the folding arms 14 upwards, as shown in FIG. 1D, on the one hand the third pull/push rod 103 is moved with respect to the first pull/push rod 101 and simultaneously the fourth pull/push rod 105 is moved with respect to the second pull/push rod 107. When the drum halves 2, 3 are at a standstill during lifting the folding arms 14, only the second spindle 115 needs to be driven.

FIG. 2 schematically shows a longitudinal section of an enlarged part of a tyre building drum according to the invention, wherein the arms 14 are in the starting position. The tyre building drum is provided with a detection device for detecting whether the arms 14 are in the starting position, and for giving a detection signal indicating whether or not the arms are in the starting position. In that way the detection device may comprise an electric contact 15 arranged in the tyre building drum, which electric contact in the embodiment shown depending on whether or not making contact with a turn-up roller 11, arranged at a first free outer end of the arm 14 oriented towards the ring segment, gives a different detection signal. It will be clear that the electric contact can also be arranged on other places, such as for instance in the hinge S of the folding arm 14. Additionally or alternatively the detection device may comprise an external sensor. The detection signal can be used for automatically stopping the tyre building drum in order to prevent that a next process step is carried out, and/or for giving an alarm signal.

As shown in the embodiment according to FIGS. 2-6 the fourth flight pin 106 engages onto an arm support 17 for being able to shift the arm supports and thus the folding arms 14. In the inactive position shown in FIG. 2 the arm support 17 abuts a wall 19 of a stop part 22.

In the embodiment shown of the invention the second outer end of each arm 14 is provided with abutting end 18. Furthermore each stop part 22 is provided with a recess 24 at its external circumference, wherein a safety bush 25 is accommodated in the recess 24. The safety bush 25 has a contact wall 26 which by means of a prestressing spring 27 is sealingly pressed against a wall 28 of the recess 24. The safety bush 25 is provided with a free outer end 29 which in starting position abuts the abutting end 18 of the arms 14 in a forceless manner. An electric contact 21 can be arranged in the stop part 22 for detecting whether the arm support 17 abuts the stop part 22. Alternatively said electric contact can be replaced by a channel portion (not shown) that communicates with the air channel. Moreover said electric contact can also be accommodated in the main housing 4, as the shafts continue up into the main housing.

An air channel 20 runs through the stop part 22, which air channel is connected or can be connected to a compressed air source 23. Connected to the air channel 20, or its connection with the compressed air source 23, are a flow meter F and/or a pressure meter P for measuring the flow and/or the pressure, respectively, in the air channel 20. The air channel 20 debouches at the location of the exit K2 in the contact wall 26 of the safety bush 25, wherein it is noted that for connection of the stop part 22 to the safety bush 25 an at least partially flexible conduit is used.

The operation of the tyre building drum is elucidated in short below.

In the position shown in FIG. 2 the arms 14 are in the starting position. In said position the arm support 17 is held against the stop part 22. The spring 27 also keeps the exit K2 closed. The detection device (the flow meter F and/or the pressure meter P) does not measure flow (or a certain pressure by the pressure meter), so that the detection device gives a signal indicating that the arms are correctly in the starting position, so that the next process step can be proceeded with.

In said next process step (FIG. 3) the drive mechanisms drive the fourth flight pin 106 in the direction of the arrow, so that the arms 14 are brought into the tilting position. In said process step the detection device has no function and can therefore be switched off for instance. The signals given need not be processed either.

In the next process step shown in FIG. 4, the fourth flight pin 106 is shifted by the drive mechanisms in a direction opposite to the one shown in FIG. 3 (see arrow), as a result of which the arms 14 are brought back from the tilting position via the intermediate position shown in FIG. 4 into the starting position again. As can be seen in FIG. 4 the exit K2 is closed off by the spring 27.

In FIG. 5 a schematic longitudinal section of a part of a tyre building drum according to the invention is shown, wherein at least one of the arms 14 is incorrectly in the starting position. In this case the electric contact detects that the arm support 17 correctly abuts the stop part 22 and has arrived in the inactive position (or starting position). The exit K2 is opened however because one or several arms 14 bump against the free outer end 29 of the safety bush 25 and press in the spring 27. Now the flow meter F detects a large flow, as a result of which the signal given by the flow meter indicates an incorrect position of at least one of the arms 14, as a result of which for instance the rotation of the tyre building drum is automatically stopped, and it is ensured that no next process step can be carried out. An alarm can also be given, so that an operator is able to place the arms in the correct (safe) position, as shown in FIG. 6. Alternatively or additionally the signal of the electric contact 21 can be used, that in the situation as shown in FIG. 5 indicates that the arm has not arrived in the correct position. In that way it can be ensured that as a condition for carrying out a next process step the detection device should indicate that all arms are in the correct starting position.

In FIG. 7 a schematic longitudinal section of an enlarged part of a second exemplary embodiment of a tyre building drum according to the invention is shown, wherein the clamping mechanism 13 and its drive 13a, are in the starting position. The tyre building drum is provided with a detection device for detecting whether the clamping mechanism 13 is in the starting position, and for giving a detection signal indicating whether or not the clamping mechanism is in the starting position.

An air channel 20a connected or connectable to a compressed air source 23a runs through the wall of the drum shaft 1. Connected to the air channel 20a, or its connection to the compressed air source 23a, are a flow meter F and/or a pressure meter P, for measuring the flow or the pressure, respectively, in the air channel 20a. At the location of the opening or exit K3 the air channel 20a debouches in the contact wall of the drive of the clamping device 13a.

In the initial, position as shown in FIG. 7 the drive mechanism of the clamping mechanism 13a substantially sealingly abuts the opening or exit K3 and there is substantially no flow and a pressure is able to build up within the air channel.

When the drive mechanism of the clamping mechanism 13a is activated for driving a radial expansion of the clamping mechanism 13, as shown in FIG. 8, the exit is opened, as a result of which air is able to flow out of the opening and a flow arises in the air channel 20a. Furthermore the pressure in the air channel will at least partially drop away. By detecting the pressure and/or the flow in the air channel 20, it can be detected whether or not the clamping mechanism 13 is in the wanted starting position.

It is noted here that the flow meter F and/or the pressure meter P can be placed remote from the opening K3, and preferably are placed in the main housing 4.

In a further embodiment of a building drum one or more of the detection devices described above can be combined.

The invention is described above by way of example on the basis of a tyre building drum wherein the means for shifting the arm supports comprise drive mechanisms and driven spindles. The invention, however, is not limited to application to said tyre building drums but can also be applied to tyre building drums wherein the means for shifting the arm supports contain pneumatic piston/cylinder assemblies, wherein each assembly comprises a cylinder room and a piston movable therein, which piston is connected to an arm support, and which piston divides the cylinder room into a first cylinder room part and a second cylinder room part, wherein each assembly can be operated via an air conduit connected or connectable to a compressed air source.

The invention can also be applied in the detection of whether or not tyre components and/or bead cores are situated at the wanted position. For instance the tyre components and/or the bead cores, when present, are able to close off an opening in the air channel in a substantially sealing manner, as a result of which the presence of the tyre components and/or the bead cores can be detected by the flow and/or pressure meter.

LIST OF REFERENCE NUMBERS

1 Drum shaft
2 First drum half
3 Second drum half
4 Main housing
5 Drive shaft
6 Bearing device 7 Belt transmission
8 Drum shaft driving motor
9 Drive mechanism
10 Drive mechanism
11 Turn-up roller
12 Shoulder support
13 Clamping mechanism (ring segment)
13a drive for clamping mechanism
14 Folding arms
15 Electric contact
15a Electric contact
15b Electric contact
16 Flange coupling
17 Arm support
18 Abutting end
19 Wall of stop part
20 Air channel
20a Air channel
21 Electric contact
22 Stop part
23 Compressed air source
23a Compressed air source
24 Recess stop part
25 Safety bush
26 Contact wall for safety bush
27 Prestressing spring
28 Wall of recess
29 Free outer end of safety bush
F Flow meter
P Pressure meter
K2 Exit
K3 Exit
S Hinge
b beads
h centre line
t tyre components
v perpendicular bisector plane
101 First pull/push rod
102 First connecting part/flight pin
103 Third pull/push rod
104 Third connecting part/flight pin
105 Fourth pull/push rod
106 Fourth connecting part/flight pin
107 Second pull/push rod
108 Second connecting part/flight pin
109 First flight nut
110 Third flight nut
111 Fourth flight nut
112 Second flight nut
113 First spindle
114 First servomotor
115 Second spindle
116 Second servomotor

The invention claimed is:

1. Tyre building drum with turn-up mechanism for use in building an unvulcanised tyre using rubber tyre components (t), with two bead cores (b), wherein the tyre building drum is provided with:
  a central drum shaft (1);
  two ring segments (13) placed around the shaft and spaced apart from each other, for supporting the bead cores (b);
  an expansion device for radially expanding the part of the tyre components situated axially between the ring segments;
  two sets of, in a correct starting orientation, axially extending arms (14) that are placed on either side axially outside of the ring segments with respect to the center of the tyre building drum, wherein at a first free outer end oriented towards the ring segments the arms of each set are provided with a respective first turn-up members (11), and wherein all arms of each set, at an opposing second outer end, are hinged to a respective axially shiftable arm support (17), common to the set in question,
  a shifting device for shifting the arm supports (17) axially from respective axial home position in respective first directions to the center of the tyre building drum to move the second outer ends of both sets of arms (14) axially towards each other, wherein the arms are tiltable in radial planes from the correct starting orientation to a tilting orientation for as a result axially and radially moving the first outer ends while pressing a part of the tyre components which is initially situated axially outside of the ring segments with respect to the center of the tyre building drum against the expanded part of the tyre components situated axially within the ring segments, and for shifting the arm supports (17) axially in respective second directions, opposite to their respective first directions, to their axial home position to move the arms (14) axially apart from the tilting orientation to the starting orientation,
  characterised in that the tyre building drum is provided with a detection device for detecting whether at least one of the arms of one of the sets of arms of the tyre building drum is correctly axially extending in the starting orientation when the associated arm support of the one set has been shifted into its axial home position, wherein the detection device comprises compressed air source (23) and an air channel (20) connected or connectable with the compressed air source, wherein the air channel comprises an opening (k2), and wherein the at least one of the arms (14), at least in or near the starting orientation, is coupled to the opening for adjusting or changing a flow and/or a pressure in the air channel,
  wherein the detection device furthermore comprises a flow meter (F) for measuring the flow in the air channel,
  wherein the at least one of the arms (14), when correctly axially extending in the starting orientation, is arranged for sealing off a contact surface of a stop part (22), wherein the air channel debouches via the opening (k2) on or in the contact surface of the stop part,
  wherein the detection device furthermore comprises a safety bush with a prestressing spring, wherein the safety bush is moveable between a closed position in which the safety bush is pressed against the contact surface in a substantially sealing manner by means of the prestressing spring and an open position in which the safety bush is moved out of sealing contact with the contact surface, and wherein one arm of the at least one of the arms (14), at least in or near the starting orientation and when its associated arm support (17) is in the respective axial home position of that arm support (17), abuts the safety bush for controlling the movement of the safety bush between the closed position and the open position,
  wherein the one arm of the at least one of the arms (14), when correctly axially extending in the starting orientation and when its associated arm support (17) is in the axial home position of that arm support (17), abuts the safety bush in a manner so that the safety bush remains in the prestressed closed position, and, in an incorrect orientation abuts the safety bush in a forceful manner to move the safety bush to the open position.

2. Tyre building drum according to claim 1, wherein the air channel at least partially runs through the stop part (22).

3. Tyre building drum according to claim 1, wherein the one arm of the at least one of the arms (14), when correctly axially extending in the starting orientation and when its associated arm support (17) is in the axial home position of that arm support (17), abuts the safety bush in a forceless manner so that the safety bush remains in the prestressed closed position.

4. Tyre building drum according to claim 1, wherein the air channel runs through a part of the safety bush.

5. Tyre building drum according to claim 1, wherein the flow meter is placed in a main housing (4) of the tyre building drum and/or spaced apart from the central drum shaft (1).

6. Tyre building drum according to claim 1, characterised in that the detection device (21) is adapted for detecting whether the arms (14) are in the starting orientation, and for giving a detection signal indicating whether or not the arms are in the starting position.

7. Tyre building drum according to claim 1, wherein the shifting device comprises pull/push rods (101, 103, 105, 107) that extend substantially parallel to a centre line (h) of the drum shaft (1) to within a main housing (4) of the tyre building drum, in which main housing a drive mechanism (9, 10) is placed with which the pull/push rods (101, 103, 105, 107) are operationally coupled, and wherein in the main housing second detection device is placed for detecting whether at least one of the pull/push rods of the tyre building drum is in a wanted position.

8. Tyre building drum according to claim 7, wherein the second detection device comprises an electric contact (15) arranged in the main housing.

9. Tyre building drum according to claim 1, wherein the detection device further comprises an electric contact arranged in the tyre building drum.

10. Tyre building drum according to claim 1, wherein the detection device is adapted for giving a detection signal when the at least one of the arms (14) is not correctly placed at the starting orientation.

11. Tyre building drum according to claim 1, wherein the safety bush comprises a free outer end which abuts the at least one of the arms of the one set when the associated arm support is in its axial home position.

12. Tyre building drum according to claim 1, wherein all arms (14) of one set, in the starting orientation and when their associated arm support (17) is in the axial home position of that arm support (17), abut the safety bush for controlling the movement of the safety bush between the closed position and the open position.

13. Tyre building drum according to the claim 12, characterized in that the detection device (21), when the arm supports (17) are in their respective axial home positions, is adapted for detecting whether all of the arms (14) are in the starting orientation, and for giving a detection signal indicating that at least one of the arms is not in the starting orientation.

14. Tyre building drum according to claim 1, wherein the safety bush (25) extends circumferentially around the stop part (22) with respect to the central drum shaft (1).

* * * * *